United States Patent
Huffman et al.

(10) Patent No.: US 7,473,410 B1
(45) Date of Patent: Jan. 6, 2009

(54) FORM OF CARBON

(75) Inventors: Donald R. Huffman, Tucson, AZ (US); Wolfgang Krätschmer, Gaiberg (DE)

(73) Assignee: Mitsubishi Corporation, Tokyo (JP)

( * ) Notice: Subject to any disclaimer, the term of this patent is extended or adjusted under 35 U.S.C. 154(b) by 0 days.

(21) Appl. No.: 08/236,933

(22) Filed: May 2, 1994

Related U.S. Application Data

(60) Continuation of application No. 07/855,959, filed on Mar. 23, 1992, now abandoned, which is a continuation of application No. 07/781,549, filed on Oct. 22, 1991, now abandoned, which is a division of application No. 07/580,246, filed on Sep. 10, 1990, which is a continuation-in-part of application No. 07/575,254, filed on Aug. 30, 1990, now abandoned.

(51) Int. Cl.
C01B 31/02 (2006.01)
C01B 31/00 (2006.01)
B82B 3/00 (2006.01)
B82B 1/00 (2006.01)

(52) U.S. Cl. .................. 423/445 B; 977/735; 977/844; 977/845

(58) Field of Classification Search ............ 423/445 B, 423/460, 449.1, 448, 445 R
See application file for complete search history.

(56) References Cited

U.S. PATENT DOCUMENTS

| | | | | |
|---|---|---|---|---|
| 2,635,994 A | * | 4/1953 | Tierman | 423/458 |
| 2,957,756 A | * | 10/1960 | Bacon | 423/447.2 |
| 3,009,783 A | * | 11/1961 | Sheer et al. | 423/450 |
| 3,094,428 A | * | 6/1963 | Hamilton et al. | 106/472 |
| 3,172,774 A | * | 3/1965 | Diefendorf | 427/249 |
| 3,317,354 A | | 5/1967 | Darrow et al. | 423/446 |
| 4,132,671 A | | 1/1979 | Deininger et al. | |
| 4,167,444 A | * | 9/1979 | Schweiger | 376/310 |
| 4,435,375 A | * | 3/1984 | Tamura et al. | 423/447.1 |
| 4,435,378 A | * | 3/1984 | Reck et al. | 423/444.5 |
| 4,767,608 A | | 8/1988 | Matsumoto et al. | 423/446 |
| 4,808,395 A | * | 2/1989 | Yoshimura et al. | 423/449.1 |
| 4,915,977 A | | 4/1990 | Okamoto et al. | 423/446 |
| 4,922,827 A | | 5/1990 | Remo | |
| 5,132,105 A | | 7/1992 | Remo | 423/446 |
| 5,227,038 A | * | 7/1993 | Smalley et al. | 204/173 |
| 5,273,729 A | * | 12/1993 | Howard et al. | 423/445 B |

FOREIGN PATENT DOCUMENTS

| | | | | |
|---|---|---|---|---|
| DE | 2414215 | * | 1/1976 | 423/449.2 |
| GB | 2101983 A | | 5/1982 | |
| JP | 2-160696 | | 6/1990 | |
| JP | 2-221194 | | 9/1990 | |

(Continued)

OTHER PUBLICATIONS

Iijima, S., Journ. Phys. Chem. (1987), vol. 91, pp 3466-3467.*

(Continued)

*Primary Examiner*—Susy Tsang-Foster
(74) *Attorney, Agent, or Firm*—Cooley Godward Kronish LLP

(57) ABSTRACT

$C_{60}$ and $C_{70}$ carbon atom compounds are prepared by evaporating graphite in an inert quenching gas. The vapor of carbon is collected and is selectively extracted with an organic nonpolar solvent.

83 Claims, 4 Drawing Sheets

FOREIGN PATENT DOCUMENTS

RU    1587000    *    8/1990

OTHER PUBLICATIONS

LeFevre, J., Astron. Astrophys., vol. 5 (1970), p 37 and 39-44.*
Huffman, D., et al. Nature (Phys. Sci.) vol. 243, pp 50-51 (1973).*
Krätschmer, W., et al., Chem. Phys. Lett., vol. 170, # 2,3, pp 167-170 (Jul. 6, 1990).*
Bacon, R., J. Applied Physics, vol. 31 # 2 (1960), pp 283-290.*
Krätschmer, W., et al., Surface Science., vol. 156, (1985), pp 814-821.*
Kratschmer, W., et al., "Search for the UV and IR Spectra of Cbo . . .", in "Dusty Objects in the Universe: Proceedings of the 4th Int. Workshop of the Astron. Observatory of Capodimonte (OAC 4)", held at Capri, Italy, Sep. 8-13, 1989.*
Huffman, D. "Methods and Difficulties in Laboratory Studies of Cosmic Dust Analogues", in book "Experiments on Cosmic Dust Analogues", Bussoletti, E., editor,. Kluwer Academic Publishers, Boston, MA (1988), pp 25-42.*
Kappler, P., "Fine Carbon Particle Formation by Carbon Vapor Condensation", J. Applied Phys., vol. 50, # 1, pp 308-316 (1979).*
Shigematsu, Kazuyoshi, "Idemitsu Tokuho", vol. 26, I (1993), pp 101-103 (Translation attached).*
Kargin, V.A., et al. "Formation of Carbon Black Particles by . . . Condensation of Carbon Vapor", Colloid J. of USSR, May-Jun. 1967, vol. 29, # 3, pp. 256-259.*
Jim Baggott, "Perfect Symmetry: The Acidental Discovery of Buckministerfullerence", Oxford University Press, pp. 138-139, 150 and 279, 1994.*
Kappler et al. (J. Appl; Phys. 50 (1), 1979, pp. 308-316).*
J. Lefevre, "Investigation of Iron and Carbon Dusts," Annales D'Astrophysique, vol. 30, No. 4, pp. 731-738, 1967.*
Translation for J. Lefevre, "Investigation of Iron and Carbon Dusts," Annales D'Astrophysique, vol. 30, No. 4, pp. 731-738, 1967.*
"Macroscopic." Hackh's Chemical Dictionary, 400, 4th ed., 1969.*
"Macroscopic." The American Heritage Dictionary of the English Language, 781 (William Morris ed., New College ed. 1976).*
Curl et al., Probing C60, Science, Nov. 18, 1988, pp. 1017-1022.
Akhter, et al., The Structure of Hexane Soot II: Extraction Studies, Applied Spectroscopy, 39(1), 1985, pp. 154-167.
Kurihara, et al., High rate synthesis of diamond by dc plasma jet chemical vapor deposition, Appl. Phys. Lett., 52(6), Feb. 8, 1988, pp. 437-438.
Matsumoto, Chemical vapour deposition of diamond in RF glow discharge, Journal of Materials Science Letters 4 (1985), pp. 600-602.
Matsumoto et al., Synthesis of diamond films in a rf induction thermal plasma, Appl. Phys. Lett. 51(10), Sep. 7, 1987, pp. 737-739.
Matsumoto et al., Growth of diamond particles from methane-hydrogen gas, Journal of Materials Science, 17(1982), pp. 3106-3112.
Spitsyn, B.V., et al., Vapor Growth of Diamond on Diamond and Other Surfaces, Journal of Crystal Growth 52(1981), pp. 219-226.
Kamo, Mutsukazu et al., Diamond Synthesis from Gas Phase in Microwave Plasma, Journal of Crystal Growth 62(1983), pp. 642-644.
O'Brien et al., Photophysics of buckminsterfullerene and other carbon cluster ions, J. Chem. Phys. 88(1), Jan. 1, 1988, pp. 220-230.
Elser et al., Icosahedral C60: an aromatic molecule with a vanishingly small ring current magnetic susceptibility, Nature, vol. 325, Feb. 26, 1987 pp. 792-794.
Haddon, et al., Rehybridization and -Orbital Alignment: The Key to the Existence of Spheroidal Carbon Clusters, Chemical Physics Letters, vol. 131, No. 3, pp. 165-169.
Rosen et al., Electronic structure of spheroidal metal containing carbon shells: study of the LaC60 and C60 clusters and their ions within the local density approximation, Z. Phys. D-Atoms, Molecules and Clusters, pp. 387-390, 1989.
Parent et al., Investigations of Small Carbon Cluster Ion Structures by Reactions with HON, J. Am. Chem. Soc. 1989, 111, pp. 2393-2401.
Lineman et al., High Mass Carbon Clusters from Aromatic Hydrocarbons Observed by Laser Mass Spectrometry, J. Phy. Chem. 1989, 93, pp. 5025-5026.
Creasy et al., Formation of high mass carbon cluster ions from laser abiation of polymers and thin carbon films, J. Chem. Phys. 92(4), Feb. 15, 1990, pp. 2269-2277.
Harano, et al., Decomposition of gaseous hydrocarbons in a laser-induced plasma as a novel carbonaceous source for cluster formation, Chemical Physics Letters, vol. 172, No. 3,4, Sep. 7, 1990, pp. 219-223.
Rohlfing et al., Two-color pyrometric imaging of laser-heated carbon particles in a supersonic flow, Chemical Physics Letters, vol. 170, No. 1, Jun. 29, 1990, pp. 44-50.
Cox et al., C60La: A Deflated Soccer Ball?, J. Am: Chem. Soc. 1986, 108, pp. 2457-2458.
Newton et al., Stability of Buckminsterfullerene and Related Carbon Clusters, J. Am. Chem. Soc., 1986, 108, pp. 2469-2470.
Laszlo et al., A Study of the UV Spectrum of the Truncated Icosahedral C60 Molecule, Journal of Molecular Structure (Theochem), 183, 1989, pp. 271-278.
Kroto et al., The formation of quasi-isosahedral spiral shell carbon particles, Nature, vol. 331, Jan. 28, 1988, pp.328-331.
Lafevre, J., Etude de Poussieres de Fer de Carbone, Tome 30, Annee 1967 Fasc. 4, pp. 731-738, Annales Astrophysique.
Hoffman, Methods and Difficulties in Laboratory Studies of Cosmic Dust Analogues, in Experiments on Cosmic Dust Analogues, Edited by Bussoletti et al. pp. 25-42 (1988).
Curl et al., Probing C60, Science, vol. 242, Nov. 18, 1988, pp. 1017-1022.
Smalley, Down-to-Earth Studies of Carbon Clusters, Carbon in the Galaxy: Studies from Earth and Space, NASA Conference Publication 3061m, 1990, 199-244.
O'Keefe et al., Production of Large Carbon Cluster Ions by Laser Vaporization, Chemical Physics Letters, vol. 130, No. 1,2, Sep. 26, 1986, pp. 17-19.
Klein et al., Isosahedral symmetry carbon cage molecules, Nature, vol. 323, Oct. 23, 1986, pp. 703-706.
McElvany et al., Ion-molecule reaction studies of mass selected carbon cluster ions formed by laser vaporization, J. Chem. Phys. 85(1), Jul. 1, 1986, pp. 632-633.
Liu et al., Negative Carbon Cluster Ion Beams: New Evidence for the Special Nature of C60, Chemical Physics Letters, vol. 126, No. 2, May 2, 1986, pp. 215-217.
Heath et al., Lanthanum Complexes of Spheroidal Carbon Shells, J. Am. Chem. Soc., 1985, 107, pp. 7779-7780.
Bloomfield et al., Negative and Positive Cluster Ions of Carbon and Silicon, Chemical Physics Letters, vol. 121, No. 1,2, Nov. 1, 1985.
Rohlfing et al., Production and characterization of supersonic carbon cluster beams, J. Chem. Phys. 81(7), oct. 1, 1994, pp. 3322-3330.
Dietz et al., Laser production of supersonic metal cluster beams, J. Chem. Phys. 74(1), Jun. 1, 1981, pp. 6511-6512.
Kroto, C60, fullerenes, giant fullerenes and soot, Pure & Appl. Chem., vol. 62, No. 3, pp. 407-415, 1990.
Kroto, Giant fullerenes, Chemistry in Britain, Jan. 1990, pp. 40-43.
Weltner, Jr., et al., Carbon Molecules, Ions and Clusters, Chem. Rev. 1989 89, pp. 1713-1747.
Kroto, Space, Stars, C60 and Soot, Science, vol. 242, Nov. 25, 1988, pp. 1139-1145.
Rohlfing, Optical emission studies of atomic, molecular and particulate carbon produced from a laser vaporization cluster source, J. Chem. Phys. 89(1), Nov. 15, 1988, pp. 6103-6112.
Creasy et al., Large Carbon Cluster Ion Formation by Laser Ablation of Polyimide and Graphite, Chemical Physics 126, (1988), pp. 453-468.
Gerhardt et al., Large Ionic Species in Sooting Acetylene and Benzene Flames, AGARD Proc. No. 422, Combustion and Fuels in Gas Turbine Origins, p. 22-1-22-11 (1988).
Gerhardt et al., The Formation of Polyhedral Carbon Ions in Fuel-Rich Acetylene and Benzene Flames, Twenty-Second Symposium (International) on Combustion/The Combustion Institute, 1988, pp. 395-401.
Weiss et al., Photophysics of Metal Complexes of Spheroidal Carbon Shells, J. Am. Chem. Soc., 1988, 110, pp. 4464-4465.

So et al., First Observation of Carbon Aggregate Ions C600 by Laser Desorption Fourier Transform Mass Spectrometry, *J. Phys. Chem.* 1989, 93, pp. 1184-1187.

Snow et al., A search for interstellar and circumstellar C60, *Astron. Astrophys.* 213, 1989, pp. 291-294.

Smalley, Supersonic Carbon Cluster Beams, In Atomic and Molecular Clusters, E.R. Bernstein Editor of Elsevies (*Science*, Mar. 1990) pp. 1-68.

O'Brien et al., A Reply to Magic Numbers in Cn+ and Cn- Abundance Distributions Based on Experimental Observations, *Chemical Physics Letters*, vol. 132, No. 1, Nov. 28, 1986, pp. 99-102.

Heymann; Buckminsterfullerene, its Siblings, and Soot, Carriers of Trapped Inert Gases in Meteorites?, *Proceedings of the Seventeenth Luna and Planetary Science Conference*, Part 1, Journal of Geophysical Research, vol. 91, No. B13, Nov. 30, 1986, pp. E135-E138.

Heath, The Formation of Long Carbon Chain Molecules during Laser Vaporization of Graphite, *J. Am. Chem. Soc.*, 1987, 109, pp. 359-363.

Heath et al., Long Carbon Chain Molecules in Circumstellar Shells, *The Astrophysical Journal*, 314, Mar. 1, 1987, pp. 352-355.

Geusic et al., Photodissociation of carbon cluster cations, *J. Chem. Phys.* 86(7), Apr. 1, 1987, pp. 3862-3869.

McElvany et al., FIMS Studies of Mass-Selected, Large Cluster Ions Produced by Direct Laser Vaporization, *Chemical Physics Letters*, vol. 134, No. 3, Feb. 27, 1987, p. 214-219.

Cyvin et al., Molecular Vibrations of Footballene, *Chemical Physics Letters*, vol. 143, No. 4, Jan. 22, 1988, pp. 377-380.

Radi et al., A new method of studying carbon clusters in the gas phase: Observation of size specific neutral fragment loss from metastable reacitons of mass selected Cn, n 60, *J. Chem. Phys.* 88(4), Feb. 15, 1988, pp. 2809-2814.

Cox et al., Carbon clusters revisited: The "special" behavior of C60 and large carbon clusters, *J. Chem. Phys.*, vol. 88, No. 3, Feb. 1, 1988, pp. 1588-6907.

Yang et al., Ups of buckminsterfullerene and other Large clusters of Carbon, *Chemical Physics Letters*, vol. 139, No. 3,4, Aug. 28, 1987, pp. 233-238.

Kaldor et al., The basics of molecular surfaces, *Chemtech*, May 1987, pp. 300-307.

Gerhardt et al., Polyhedral Carbon Ions in Hydrocarbon Flames, *Chemical Physical Letters*, vol. 137, No. 4, Jun. 19, 1987, pp. 306-310.

Kroto et al., C60: Buckminsterfullerene, *Nature*, vol. 318, Nov. 14, 1985, pp. 162-163.

Keller, Der C60 Cluster Footballen oder Buckminsterfullerene, *GIT. Fachz. Lab.*, 1987, 31, 618-623.

Zhang et al., Reactivity of Large Carbon Clusters: Speroidal Carbon Shells Their Possible Relevance to the Formation and Morphology of Soot, *The Journal of Physical Chemistry*, vol. 90, No. 4, Feb. 13, 1986, pp. 525-528.

* cited by examiner

US 7,473,410 B1

FORM OF CARBON

This is a continuation of application Ser. No. 07/855,959 filed on Mar. 23, 1992 now abandoned which is a continuation application of application Ser. No. 07/781,549 filed Oct. 22, 1991, now abandoned, which is a divisional application of application Ser. No. 07/580,246 filed Sep. 10, 1990, which is a continuation-in-part application of application Ser. No. 07/575,254 filed Aug. 30, 1990, now abandoned.

BACKGROUND OF THE INVENTION

This invention relates to new forms of carbon as well as methods for the production and recovery thereof from carbon sources.

In 1985, Kroto et al. postulated the existence of a highly stable molecule composed of 60 carbon atoms based solely on mass spectroscopic analysis of vaporized graphite (H. W. Kroto, et al., *Nature,* Vol. 318, 162, 14 November 1985). More specifically, all that was observed was a peak in the mass spectra of said carbon vapor. However, Kroto et al. did not isolate any of said compound.

A model for this compound was proposed in which 60 carbon atoms are placed at the vertices of a truncated icosahedron forming a perfect "soccerball" structure. Subsequent thereto, many publications have strengthened the evidence for the existence of this molecule. The 60 carbon atom compound (hereinafter $C_{60}$) was presumably produced in situ for the spectroscopic determination reported in these publications. Yet, to date, no one has been successful in verifying the existence of this molecule since no one has been successful in isolating the molecule in measurable amounts. Thus, no processes for producing recoverable amounts of this new compound have been described to the present time.

In the aforesaid publication by Kroto, et al., the authors proposed many uses for the new substance, $C_{60}$ if it could be produced in quantity such as $C_{60}$ transition metal compounds, e.g., $C_{60}$Fe; or halogenated species like $C_{60}F_{60}$ which might be a super lubricant; molecules including oxygen and lanthanum in the $C_{60}$ interior; $C_{60}$ would provide a topologically novel aromatic nucleus for new branches of organic and inorganic chemistry; and $C_{60}$ being especially stable and symmetrical provides possible catalyst and/or intermediate in modelling prebiotic chemistry.

Another form of carbon containing 70 carbon atoms ($C_{70}$) has also been postulated (Kroto, *Chemistry in Britain,* 40–45 (1990), Kroto, *Science,* 1139–1145 (1988)). Like the ($C_{60}$) to date, no one has been successful in verifying the existence of the $C_{70}$. Heretofore, no one has been successful in obtaining the molecule in any appreciable amounts.

SUMMARY OF THE INVENTION

A process has now been developed for the production of recoverable amounts of $C_{60}$ and $C_{70}$. The present new process is accomplished by evaporating carbon rods in an atmosphere of an inert quenching gas maintained at reduced pressure in a reactor therefor. This process produces a sooty carbon product which is graphitic carbon including a few percent of $C_{60}$ and low levels of $C_{70}$ which are recoverable from the product. However, an increase in the fraction of $C_{70}$ molecules can be produced if the pressure is raised to greater than atmospheric pressures.

The recovery process is preferably accomplished by selective extraction of $C_{60}$ and $C_{70}$ with non-polar organic solvents from the sooty graphitic carbon.

The processes of the present invention produces $C_{60}$ and $C_{70}$ in recoverable amounts and permits realization of the proposed uses described hereinbefore.

DESCRIPTION OF THE PREFERRED EMBODIMENTS

Figure 1:
FIG. 1: MIcrograph of typical crystals of the 98% $C_{60}$, 2% $C_{70}$ material showing thin platelets, rods and stars of hexagonal symmetry.

The first step in the production of $C_{60}$ and $C_{70}$ molecules is vaporizing carbon from any source containing carbon in its various forms, e.g., graphite, amorphous and glassy carbon. It is preferred that this vaporization takes place in an evacuated reactor (e.g., a bell jar). The carbon is vaporized by heating in the presence of an inert quenching gas. The carbon vapor is nucleated in the presence of the inert quenching gas to form smoke particles.

In the production of $C_{60}$ and $C_{70}$, any procedure for vaporizing carbon can be used, although the preferred method relies on the use of a high intensity electrical current with graphite rods as electrodes. These rods are constructed to permit vaporization of carbon at the tip of the rod to produce a high density vapor of carbon. For best results, the end of one of the rods is reduced in diameter so that the vaporization occurs at the reduced tip. The rods can be prepared using any of the various forms of carbon, such as graphite, amorphous and glassy carbon.

The inert quenching gas can be any of the usual inert gases such as the noble gas. Argon and helium are preferred, the latter being most preferred. Other inert gases commonly employed to provide a non-reactive atmosphere can also be used as quenching gas.

The amount of $C_{60}$ and $C_{70}$ produced from this carbon source is dependent upon the pressure of the quenching gas. At lower pressures relatively pure $C_{60}$ molecules can be produced in high yield with minor concentrations of $C_{70}$. For the production of predominantly $C_{60}$ molecules, the pressure at which the quenching gas is maintained should be subatmospheric and preferably about 50–400 torr. Especially preferred is a pressure of approximately 100 torr. The use of any lower pressure may result in reduced yield of $C_{60}$.

However, as the pressure is raised, the ratio of $C_{70}$:$C_{60}$ is also increased.

If the pressure is increased to at least two atmospheres, the greatest percentage of $C_{70}$ product is formed. Theoretically, the pressure can be raised to any level just below the point where the reactor would explode from the increased pressure. However, at the higher pressures, the yield of the overall product ($C_{60}$ and $C_{70}$) is reduced even though the ratio of $C_{70}:C_{60}$ is also increased. Therefore, as a practical consideration, the pressure of the quenching gas should not be greater than 10 atmospheres. The preferred pressure for maximizing the amount of $C_{70}$ produced is 2–3 atmospheres.

The produced quenched vapor of carbon, i.e., the smoked particles coats the internal surface of the reactor and of collecting substrates as black soot. These collecting surfaces are inert to the vaporized carbon. They can be transparent and/or coated with an inert metal. Examples include glass, or gold coated glass surfaces and the like. These collecting surfaces are located in the reactor in the path of the carbon smoke. The black coating can be removed by any suitable means, e.g., by scraping the solids from the coated surfaces. The $C_{60}$ and $C_{70}$ molecules can be removed from this collected quenched product by contacting said quenched product with an extracting solvent. In other words, the black soot is placed in a container containing the extracting solvent, or the extracting solvent is poured onto the black soot placed in a container. In either case, the $C_{60}$ and $C_{70}$ molecules become dissolved in the solvent, while the remainder of the black soot remains insoluble. The insoluble material is separated from the solution containing the $C_{60}$ and $C_{70}$ molecules, e.g., by decanting, or by filtration, and the like.

Suitable solvents include non-polar organic solvents, such as the alkanes containing 5–10 carbon atoms (e.g. pentanes, hexanes, heptanes, octanes), benzene and alkyl-benzenes (e.g. toluene, xylene), carbon disulfide, carbon tetrachloride, naphtha,1,1,1-trichloroethane, and the like. Simple solubility determinations using classical laboratory methods will permit selection of other suitable solvents. The preferred solvents are carbon disulfide, benzene, carbon tetrachloride and toluene. Especially preferred are benzene, carbon tetrachloride and carbon disulfide.

The product obtained contains a mixture of $C_{60}$ and $C_{70}$. As described hereinabove, the amounts of $C_{60}$ and $C_{70}$ present is dependent upon the pressure used. If subatmospheric pressures are used, such as 50–400 torr, the product is predominatly pure $C_{60}$ with a minor amount of $C_{70}$ present. Thus, when the collected product is dispersed in the extracting solvent, the product obtained is a mixture of $C_{60}$ and $C_{70}$. For example, when the pressure is 100 torr, the product formed is about 98% $C_{60}$ and about 2% $C_{70}$. This product can be separated from the organic solvent solution by standard methods as by evaporation of the solvent or by dilution of the solvent solution with a non-solvent for $C_{60}$. The product can be crystallized by careful evaporation of the organic solvent or by sublimation procedures.

In a preferred embodiment of producing $C_{60}$ and $C_{70}$, pure graphite rods are vaporized by passing high electrical current (either dc or ac) through narrowed tips of graphite rods. Electron beam, laser and RF heating can be used in lieu of electrical heating. This is done in a reactor (such as a bell jar) that has been evacuated, purged and filled with inert gas at or preferably below atmospheric pressure, e.g., pressures ranging from about 50 to about 400 torr. and even higher. The graphite rods are typically ¼ inch in diameter with about 1 cm length of one rod reduced in diameter to about 5 mm. The electrical heating vaporizes the constricted tip of the graphite rod producing a high density vapor of carbon, which quickly condenses into a smoke consisting of very fine particles (of the order of 0.1 microns) of graphitic carbon with an admixture of a few percent of the desired $C_{60}$ molecule. At this point in the process there is a heavy black coating on collecting substrates and/or on the walls of the chamber which can be easily scraped off for the recovery step.

For recovery, the sooty product is treated with benzene to provide a brownish-red solution. After separation of the undissolved graphitic carbon, the benzene solution is evaporated to obtain microcrystalline product. Alternatively, the product can be sublimed from the sooty carbon at 300° to 400° C. and the sublimation product obtained by condensation on a conventional substrate.

When the pressure of inert quenching gas is 100 torr, the product formed is 98% $C_{60}$ and 2% $C_{70}$. This product, as obtained from the solvent extract of the sooty graphitic carbon, is a dark brown to black crystalline material. When obtained by sublimation in vacuum or inter atmosphere, the product is obtained as a brown to gray coating depending on thickness.

On analysis by mass spectroscopy, the spectrum clearly shows a strong peak at mass 720 amu (i.e., the mass of $C_{60}$) and a clean peak at 840 amu (i.e., the mass of $C_{70}$). Significant differences in the spectra occur only in the abundances in the mass domain lower than 300 amu. Most of these differences seem to originate from the different ionization techniques in the mass spectrometer and from the different kinds of sample desorption. So far, the cleanest mass spectra have been obtained when the material was evaporated and ionized in the vapor phase by electrons. In such spectra the mass range about 40 amu is dominated by the $C_{60}$ mass along with its expected isotope lines. The only other large mass found in any abundance corresponds to $C_{70}$, with a ratio of $C_{70}$ to $C_{60}$ of about 0.02.

Studies by optical microscopy of the $C_{60}$ material which is left after evaporating the benzene solution show a variety of what appear to be crystals—mainly rods, platelets, and star-like flakes. FIG. 1 shows a micro-photograph of such a crystal assemblage. All crystals tend to exhibit six-fold symmetry. In transmitted light they appear red to brown in color; in reflected light the larger crystals have a metallic appearance, whereas the platelets show interference colors consistent with an index of refraction of about 2. The platelets can be rather thin and thus are ideally suited for electron diffraction studies in an electron microscope. (See the insert in FIG 2).

Figure 2:
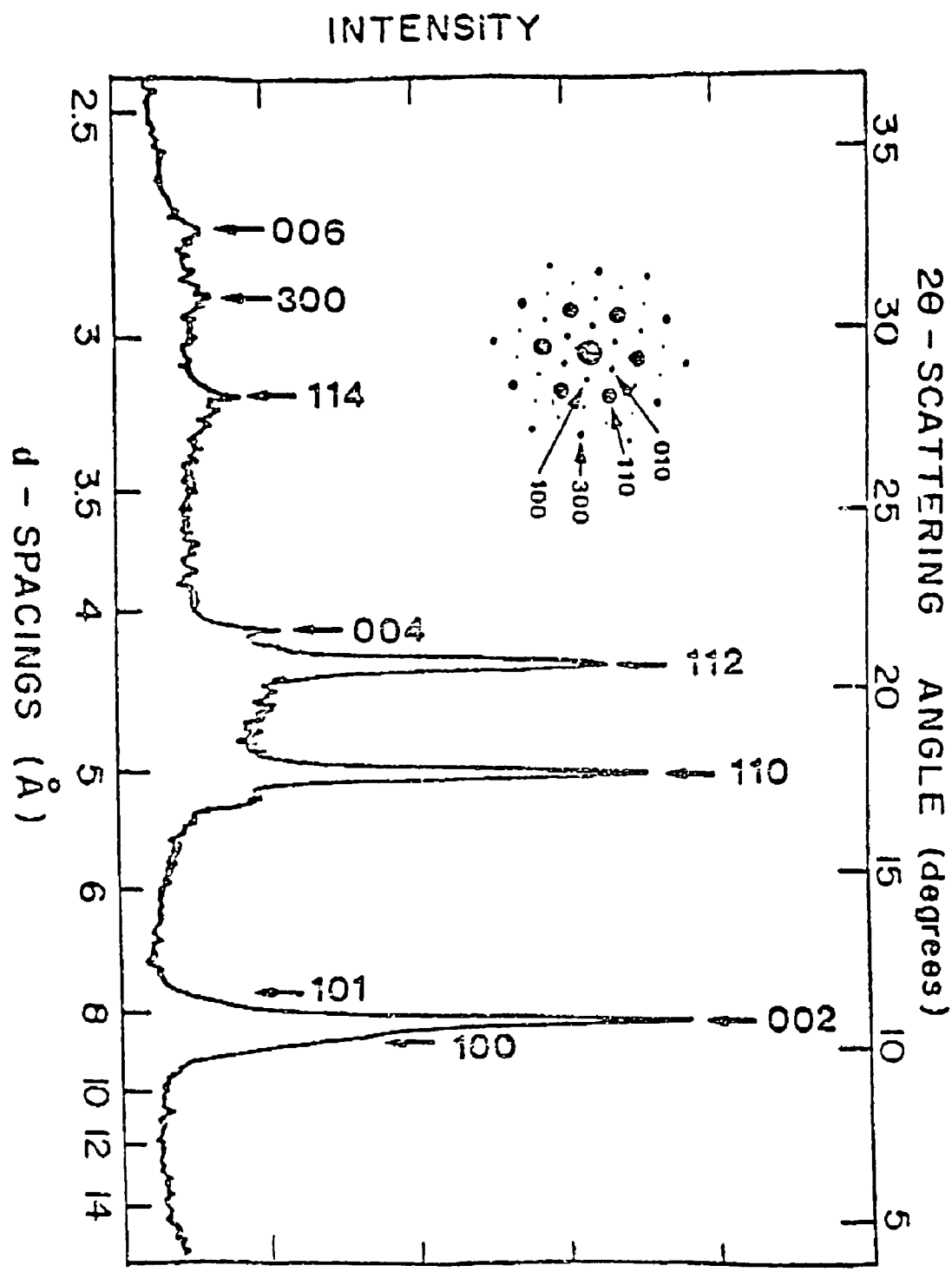
FIG. 2: X-ray diffraction of a microcrystalline powder of the 98% $C_{60}$, 2% $C_{70}$ solid material. Inset at upper left is a single crystal electron diffraction pattern indexed with Miller indices compatible with the X-ray pattern, taken on a thin platelet as in FIG. 1 with the electron beam perpendicular to the flat face.

In order to determine if the $C_{60}$ molecules form a regular lattice electron, x-ray diffraction studies on the individual crystals and on the powder were carried out. A typical X-ray diffraction pattern of the purified $C_{60}$ powder is shown in FIG. 2. To aid in comparing the electron diffraction results with the X-ray results the electron diffraction pattern is inserted into the corner of FIG. 2. From the hexagonal array of diffraction spots indexed as shown in the Figure, a d-spacing of 8.7 Å was deduced corresponding to the (100) reciprocal lattice vector of a hexagonal lattice. The most obvious correspondence between the two types of diffraction is between the 5.01 Å peak of the X-ray pattern and the (100) spot of the electron diffraction pattern, which gives a spacing of about 5.0 Å. Assuming that the $C_{60}$ molecules are behaving approximately as spheres stacked in a hexagonal close packed lattice with a c/a ratio of 1.633, d-spacings can be calculated. The results are shown in Table I.

TABLE I

X-Ray Diffraction Results and
Assignments For a Hexagonal Lattice Using a = 10.02 Å,  c = 16.36 Å

$$\frac{1}{d^2} = \frac{4(h^2 + hk - k^2)}{3(a^2)} + c_2^2$$

| Measured 2θ (degrees) | Measured d-spacing (Å) | Calculated d-spacing (Å) | Assignment (hkl) |
|---|---|---|---|
| 10.2 shoulder | 8.7 | 8.68 | (100) |
| 10.81 | 8.18 | 8.18 | (002) |
|  |  | 7.67 | (101) |
| 17.69 | 5.01 | 5.01 | (110) |
| 20.73 | 4.28 | 4.27 | (112) |
| 21.63 | 4.11 | 4.09 | (004) |
| 28.1 | 3.18 | 3.17 | (114) |
| 30.8 | 2.90 | 2.89 | (300) |
| 32.7 | 2.74 | 2.73 | (006) |

The values derived from this interpretation are a=20.02 Å and c=16.36 Å. The nearest neighbor distance is thus 10.02 Å. For such a crystal structure the density is calculated to be 1.678 g/cm³, which is consistent with a value of 1.65+/−0.05 determined by suspending crystal samples in aqueous $GaCl_3$ solutions of known densities. Although the agreement shown in Table 1 is good, the absence of the characteristically strong (101) diffraction in hcp and the broad continuum in certain regions suggest a less than perfect crystalline order. Furthermore, X-ray diffraction patterns obtained on carefully grown crystals up to 500 micrometers in size with well developed faces yielded no clear spot pattern (in contrast to the electron diffraction pattern on micron-size crystals). It thus appears that these larger crystals do not exhibit long range periodic order in all directions.

A likely explanation for the unusual diffraction lies in the disordered stacking arrangement of the molecules in planes normal to the c-axis. It is well known that the position taken by spheres in the third layer of stacking determines which of the close-packed structures occurs, the stacking arrangement in fcc being ABCABC while that in hop is ABABAB. If the stacking sequence varies, the X-ray lines due to certain planes will be broadened by the disorder while other lines will remain sharp. Such disordered crystalline behavior was observed long ago in the close packed structure of cobalt, where X-ray diffraction lines such as (101), (102) and (202) were found to be substantially broadened due to the stacking disorder. Reflections from planes such as (002) remain sharp since these planes have identical spacings in both fcc and hcp structures. A general expression for which peaks are broadened by this kind of disorder have been given in terms of Miller indices (h,k,l) as h−k=3t±1, l≠0, where t is an integer. None of these broadened reflections are apparent in the X-ray pattern of FIG. 2. This may explain the weakness of the characteristically strong (101) peak. Whether or not this stacking disorder is related to the presence of the possibly elongated $C_{70}$ molecules is yet to be determined.

In small crystals at least, the $C_{60}$ molecules appear to be assembling themselves into a somewhat ordered array as though they are effectively spherical, which is entirely consistent with the soccer ball hypothesis for their structure. The additional diameter over the calculated 7.1 Å value for the carbon cage itself must represent the effective van der Waals diameter set by the repulsion of the pi electron clouds extending outward from each carbon atom. Scanning tunnelling spectroscopy of the $C_{60}$ molecules clearly shows the spherical nature of the $C_{60}$ molecules.

Some scanning tunnelling microscope images of a carbon sample prepared in accordance with the procedure described hereinabove at pressures of helium at 100 torr show a spherical molecule of twice the diameter of the $C_{60}$ molecules. This is evidence of the existence of a caged molecule containing 240 carbon atoms or a $C_{240}$ molecule.

Samples were prepared for spectroscopy by subliming pure material onto transparent substrates for transmission measurements. Depending on the pressure of helium in the sublimation chamber, the nature of the coatings can range from uniform films (at high vacuum) to coatings of $C_{60}$ smoke (i.e., sub-micron microcrystalline particles of solid $C_{60}$) with the particle size depending to some extent on the pressure.

Figure 3:
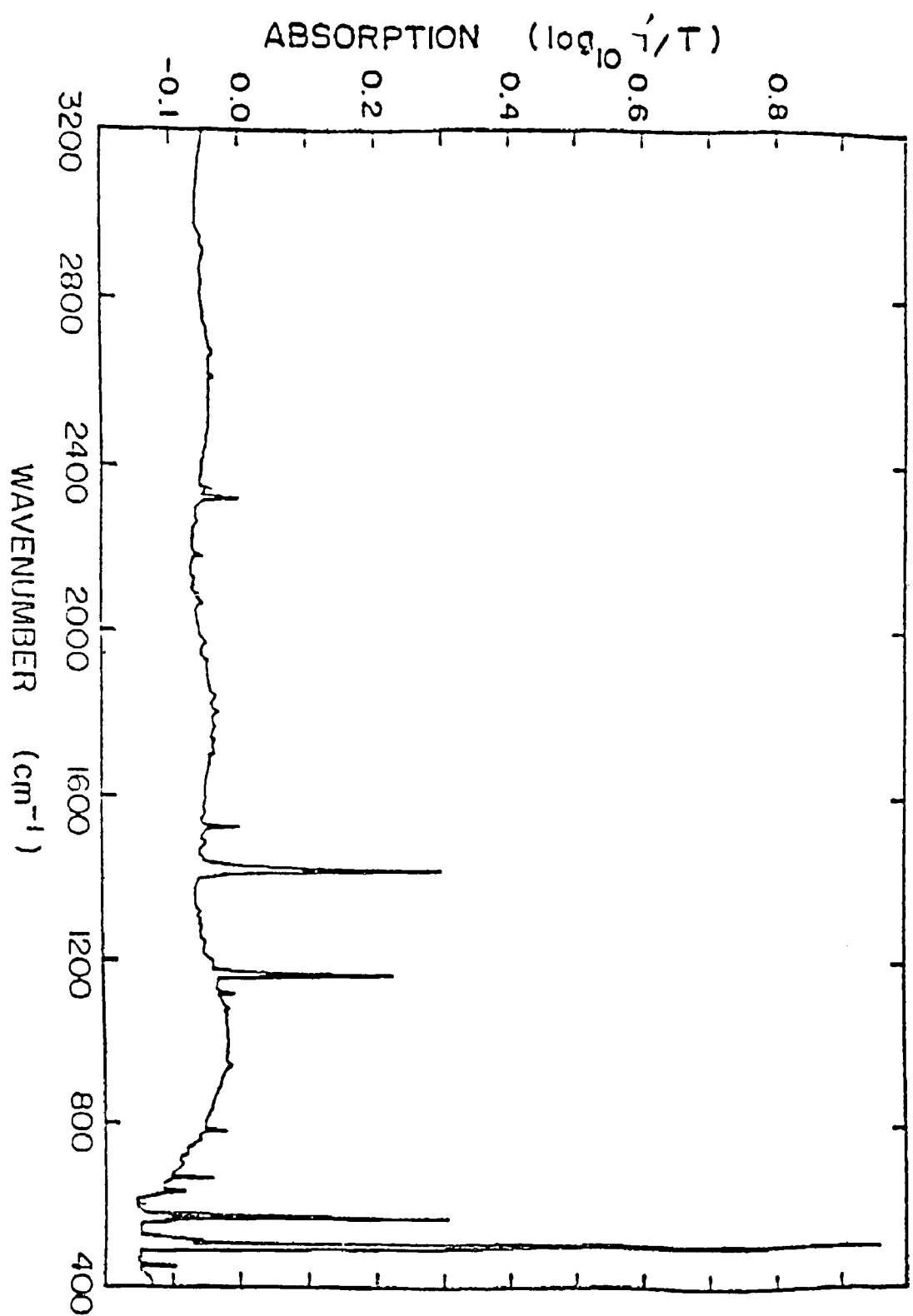
FIG. 3: Infrared absorption spectrum of an approximately 2 micrometer thick coating of the 98% $C_{60}$, 2% $C_{70}$ material on a silicon substrate, referenced to a clean silicon substrate. Absorption is given as optical density=$\log_{10} 1/T$, where T is transmission. Apparent negative absorptions are due to the coating acting in part as a non-reflecting layer.

FIG. 3 shows the transmission spectrum of an approximately 2 micrometer thick $C_{60}$ coating on a silicon substrate. The infrared bands show the four most intense lines at 1429, 1183, 577, and 528 cm$^{-1}$, with no underlying continuum remaining from the soot. In early tries at purifying $C_{60}$ material, the infrared spectrum showed a strong band in the vicinity of 3.0 micrometers, which is characteristic of a CH stretching mode. After much effort, this contaminant was successfully removed by washing the soot with ether and using distilled benzene in the extraction. The spectrum in FIG. 3 was obtained when the material cleaned in such a manner was sublimed under vacuum onto the substrate. The spectrum shows very little indication of CH impurities.

The presence of only four strong bands is what is expected for the free, truncated icosahedral molecule with its unusually high symmetry. Also present are a number of other weak infrared lines which may be due to other causes, among which may be absorption by the $C_{70}$ molecule or symmetry breaking produced, for example, by isotopes other than $C^{12}$ in the $C_{60}$ molecule or by mutual interaction of the $C_{60}$ molecules in the solid. Noteworthy, are weaker features at about 2330 and 2190 cm$^{-1}$ which are located in the near vicinity of the free $CO_2$ and CO stretching modes. This may imply some attachment of $CO_2$ or CO to a small fraction of the total number of $C_{60}$ molecules. Another noteworthy effect can be observed in the feature at 675 cm$^{-1}$, which is weak in the thin film samples but almost as strong as the four main features in the crystals. This vibrational mode may be of solid state rather than molecular origin.

Figure 4:
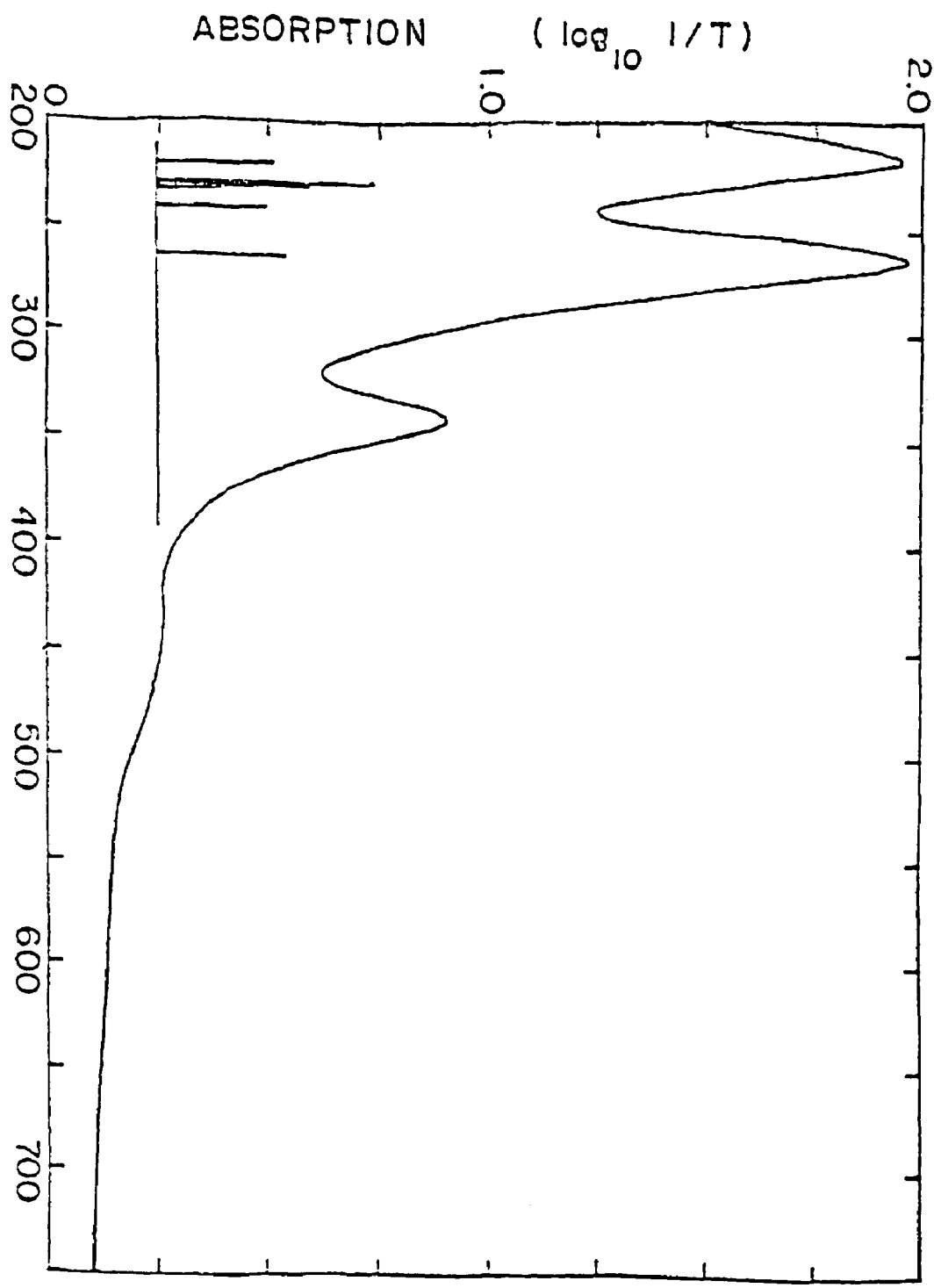
FIG. 4: Visible-ultraviolet absorption spectrum of an approximately 0.1 micrometer thick coating of the 98% $C_{60}$, 2% $C_{70}$ material on quartz. Shown at the bottom are positions and relative oscillator strengths for allowed transitions calculated for the $C_{60}$ molecule by Larsson, et al.

FIG. 4 shows an absorption spectrum taken on a uniform film coated onto a quartz glass substrate. The ultraviolet features are no longer obscured by the graphitic carbon background as in our previous spectra. Broad peaks at 216, 264 and 339 nm dominate the spectra. Weaker structures show up in the visible, including a plateau with ends at about 460 and 500 nm and a very weak peak near 625 nm. At the bottom of FIG. 4 are shown positions and relative oscillator strengths taken from Larsson, et al. (Chem. Phys. Lett. 137, 501–504) calculated for the $C_{60}$ molecule. This reference also shows a variety of forbidden bands with the lowest energy ones in the vicinity of 500 nm. There seems to be a rough correspondence between the present measurements on thin films and the allowed transitions predicted for the molecule. There was no band at 386 nm in our films of $C_{60}$, a disclosed by Heath, et al. (J. Chem. Phys. 87, 4236–4238 (1987)) using a laser depletion spectroscopy method and attributed to the $C_{60}$ molecule. Quite similar spectra to that in FIG. 4 have been recorded for microcrystalline coatings deposited at helium pressures of 100 torr, for example. The peaks occur at the slightly shifted positions of 219, 268, and 345 nm.

The $C_{70}$ molecule is larger than the $C_{60}$ molecule. The $C_{70}$ molecule shows a molecular ion peak at 840 amu. Furthermore, a noticeable peak in the ultraviolet spectrum of the $C_{70}$ molecule taken on a uniform film coated onto a quartz glass substrate is exhibited at about 216 nm. This is a broad peak. Surprisingly, it appears that the $C_{70}$ molecule is more stable than $C_{60}$.

Thus, using the procedures described hereinabove, at quenching pressures of less than 1 atmospheric pressure and especially at pressures of 50–400 torr, a product is produced which is predominantly $C_{60}$ and contains minor amounts of $C_{70}$. The $C_{60}$ product can be used or can be further purified.

Further purification and separation of $C_{60}$ and $C_{70}$ can be made by many conventional techniques known to one skilled in the art; e.g., fractional crystallization, column chromatography, capillary electrophoresis, HPLC, preparative thin-layer chromatography, and the like.

Because the molecular figuration of $C_{60}$ and $C_{70}$ are different, the attractive intermolecular forces are different which allows for the two molecules to be readily separated.

Furthermore, the solubility of $C_{60}$ and $C_{70}$ in pure solvents and mixed solvents are also different from each other, which also makes the two compounds separable by using conventional techniques known to one skilled in the art, such as crystallization, extraction, and the like.

For example, pure $C_{60}$ and pure $C_{70}$ molecules can be isolated as follows. The black sooty mixture of $C_{60}$ and $C_{70}$ which is produced according to the procedure described hereinabove is placed in the extracting solvent, such as benzene. The insoluble residue is removed and the resulting benzene solution containing $C_{60}$ and $C_{70}$ molecules is concentrated. The $C_{60}$ and $C_{70}$ solution is added to a packed column with an adsorbent, such as alumina. The column is eluted with an eluent such as benzene or a mixture of benzene and toluene. Various fractions of set volume e.g., 10 mL, are collected. The eluent i.e., the solvent is removed from each fraction such as by evaporation to dryness. The fractions with product will contain microcrystals, the identity of which can be confirmed by spectroscopy, e.g., mass spectroscopy.

Thus, the process of the present invention can produce a product which is predominantly $C_{60}$, which, if desired, can be further purified by the purification and separation techniques described hereinabove.

Furthermore, the present invention contemplates two different variations of the procedure described hereinabove to make $C_{70}$ molecules. First, if subatmospheric pressures of quenching gases are used in the initial step, small amounts of $C_{70}$ are produced, which can be separated from the $C_{60}$ molecules using the purification techniques described hereinabove. However, if the pressure of the quenching gas is raised to at least 2 atmospheres, after separation and purification, a greater percentage of substantially pure $C_{70}$ would be produced from each vaporization of carbon.

The present new products, $C_{60}$, $C_{70}$, or mixtures thereof have the similar utilities as graphite. However, they are particularly valuable for forming products of a higher order of stability than those formed from graphitic carbon, and can be processed into formed or molded products such as $C_{60}$ fibers, $C_{70}$ fibers, or mixtures thereof using standard processing techniques. In this regard, free-flowing, particulate $C_{60}$ and $C_{70}$ are of special value particularly for use in producing molded products, especially those extended in at least one direction. $C_{60}$, and $C_{70}$ are also useful for producing a low temperature $C_{60}$ vapor (300°–400° C.) and $C_{70}$ vapor of the respective molecules to produce low temperature atomic and molecular beams of carbon which is not now possible using graphite as the carbon source. Further, the synthesis of compounds such as $C_{60}H_{60}$ and $C_{60}F_{60}$ can be accomplished by introducing hydrogen and fluorine, respectively, into a reactor containing $C_{60}$ vapor. Furthermore, the $C_{60}$ product and the $C_{70}$ product may be used as an industrial paint pigment or as a lubricant. Moreover, since the $C_{60}$ and $C_{70}$ molecule are hollow, they could be used for binding and/or storing molecules e.g., toxic material.

EXAMPLE 1

$C_{60}$-containing carbon dust was produced in a conventional bell-jar carbon evaporator which was first evacuated to $10^{-4}$ torr by either an oil diffusion pump or a turbo pump, both equipped with liquid nitrogen traps, and then filled with an inert quenching gas. Helium and argon were used at pressures ranging up to 400 torr. Then graphite rods (as previously described herein) were evaporated using a current of about 100 amps (either AC or DC).

The smoke which formed in the vicinity of the evaporating carbon rods was collected on substrates which were placed within 5 cm to 10 cm of the evaporating carbon rods.

The evaporator was opened after a cool down period of 10–30 min. and the carbon dust samples removed by scraping substrate surfaces and the internal surfaces of the bell-jar. After washing with ether, the collected dust samples were then extracted with benzene to produce a wine-red to brown solution. On evaporation of the solution, $C_{60}$ was obtained as a microcrystalline residue.

The crystals were sublimed by heating in vacuo or in a quenching inert gas to 400° C. and collected on a substrate. The sublimed product was brown to gray in color.

In powder form, the present new carbon allotrope is brownish-red.

EXAMPLE 2

The procedure of Example 1 is repeated except, in the original step, the graphite rods are evaporated at 2 or more atmospheres of helium pressure in the chamber. The product obtained from this procedure contains a greater percentage of $C_{70}$ than does the product in Example 1.

EXAMPLE 3

Pure $C_{60}$ and pure $C_{70}$ are obtained as follows:

The $C_{60}$ and $C_{70}$ mixtures prepared in either Examples 1 or 2 are dissolved in benzene and added to an alumina column. Using benzene as the eluent, the fractions are collected and each elute fraction is evaporated to dryness. The presence of $C_{60}$ or $C_{70}$ in the fraction can be determined by taking mass spectroscopy thereof.

The above embodiments and examples are given to illustrate the scope and spirit of the instant invention. These embodiments and examples are within the contemplation of the present invention. Therefore, the present invention should be limited only by the appended claims.

What is claimed is:

1. A process for preparing $C_{60}$ comprising:
   (a) vaporizing elemental carbon in the presence of an inert quenching gas under conditions effective to form a sooty carbon product comprising $C_{60}$ molecules, said $C_{60}$ molecules being present in said sooty carbon product in amounts capable of extracting therefrom said Cw in macroscopic amounts; and
   (b) extracting $C_{60}$ in macroscopic amounts from said sooty carbon product.

2. A process for preparing $C_{60}$ comprising:
  (a) vaporizing elemental carbon in the presence of an inert quenching gas under conditions effective to form a sooty carbon product comprising $C_{60}$ molecules in macroscopic amounts;
  (b) depositing the sooty carbon product on a collecting surface remote from situs of vaporization;
  (c) removing the sooty carbon product from the collecting surface; and
  (d) extracting a product comprising a macroscopic amount of $C_{60}$ from said sooty carbon product.

3. The process of claim 1 or 2 wherein $C_{70}$ is additionally present in the sooty carbon product and is additionally extracted therefrom.

4. The process of claim 1 or 2 wherein $C_{70}$ is additionally present in the sooty carbon product and is separated from the $C_{60}$.

5. The process of claim 4 wherein the $C_{70}$ separated from said $C_{60}$ is purified solid $C_{70}$.

6. The process of claim 5 wherein the purified solid $C_{70}$ is purified crystalline $C_{70}$.

7. The process according to claim 1 or 2 wherein extracting comprises contacting the sooty carbon product with a non-polar organic solvent effective to dissolve the $C_{60}$, said solvent being present in amounts sufficient to dissolve the $C_{60}$ present in said sooty carbon product.

8. The process according to claim 7 wherein extracting further comprises separating from said solvent a solid $C_{60}$.

9. The process of claim 7 wherein the non-polar organic solvent is carbon disulfide, benzene, carbon terrachloride or toluene.

10. The process of claim 9 wherein the solvent is benzene.

11. The process of claim 9 wherein separating the solid $C_{60}$ from the solvent comprises evaporating the solvent.

12. The process of claim 8 further comprising the step of purifying the solid $C_{60}$.

13. The process of claim 12 wherein the purifying step is sublimation, crystallization, column chromatography, capillary electrophoresis, HPLC, preparative thin-layer chromatography or extraction.

14. The process according to claim 7 wherein extracting further comprises evaporating the solvent off thereby forming a residue, and subliming the $C_{60}$ from said residue.

15. The process of claim 1 or 2 wherein extracting comprises subliming the $C_{60}$ from the sooty carbon product and condensing the sublimed $C_{60}$.

16. The process of claim 15 wherein the $C_{60}$ is sublimed from the sooty carbon product at 300-400° C.

17. The process of claim 15 wherein subliming comprises heating the $C_{60}$ in a vacuum or inert atmosphere at effective sublimation temperatures to extract $C_{60}$ from said sooty carbon product.

18. The process of claim 1 or 2 wherein the elemental carbon is placed into an evacuated reactor prior to the vaporization thereof 19. The process of claim 1 or 2 wherein the elemental carbon is vaporized in a bell jar carbon evaporator.

20. The process of claim 1 or 2 wherein the elemental carbon subject to vaporization is graphite, or amorphous or glassy carbon.

21. The process of claim 20 wherein the elemental carbon subject to vaporization is graphite.

22. The process of claim 1 or 2 wherein the elemental carbon subject to vaporization is graphite rods.

23. The process of claim 1 or 2 wherein the elemental carbon is vaporized by passing an electrical current of sufficient intensity through said carbon source to produce the sooty carbon product.

24. The process of claim 23 wherein the electrical current is about 100 amps.

25. The process of claim 1 or 2 therein the inert quenching gas is a noble gas.

26. The process of claim 25 wherein the noble gas is helium or argon.

27. The process according to claim 1 wherein said extracted $C_{60}$ is in solution.

28. The process according to claim 27 wherein said extracted $C_{60}$ is in solution of a non-polar organic solvent.

29. The process according to claim 27 wherein the non-polar organic solvent is benzene, toluene, carbon tetrachloride, 1,1,1-trichloroethane, xylene or alkanes having 5-10 carbon atoms.

30. The process according to claim 2 wherein said extracted $C_{60}$ is in solid form.

31. The process according to claim 2 wherein said extracted $C_{60}$ is in solution.

32. The process according to claim 31 wherein said extracted $C_{60}$ is in solution of a non-polar organic solvent.

33. The process according to claim 32 wherein said non-polar organic solvent is benzene, toluene, carbon tetrachloride, 1,1,1-trichloroethane, xylene or alkanes having 5-10 carbon atoms.

34. The process according to claim 30 wherein the $C_{60}$ in solid form is a crystalline solid.

35. The process of claim 30 wherein the $C_{60}$ in solid form is purified crystalline $C_{60}$.

36. The process of claim 2 wherein depositing comprises collecting the sooty carbon product on a collecting surface distanced 5-10 cm from said vaporization.

37. The process of claim 2 wherein the collecting surface is a glass surface.

38. The process of claim 2 wherein the depositing step comprises collecting the sooty carbon product on said collecting surface distanced 5-10 cm from said vaporization.

39. A process for preparing $C_{60}$ comprising:
  (a) vaporizing elemental carbon in the presence of an inert quenching gas under conditions effective to form a sooty carbon product comprising $C_{60}$ molecules, said $C_{60}$ molecules being present in said sooty carbon product in amounts capable of extracting therefrom said $C_{60}$ in solid form; and
  (b) extracting in solid form $C_{60}$ from said sooty carbon product.

40. A process for preparing $C_{60}$ comprising
  (a) vaporizing elemental carbon in the presence of an inert quenching gas at a pressure sufficient to generate a sooty carbon product comprising $C_{60}$, said $C_{60}$ being present in said sooty carbon product in sufficient amounts to produce and collect therefrom crystalline $C_{60}$;
  (b) separating said $C_{60}$ from said sooty carbon product under conditions effective to recover crystalline $C_{60}$.

41. The process according to claim 40 wherein the pressure is less than 1 atmosphere.

42. The process according to claim 41 wherein the pressure is at least about 50 torr.

43. The process according to claim 42 wherein the pressure ranges from about 50 to about 400 torr.

44. The process according to claim 40 wherein $C_{70}$ is additionally present in the sooty carbon product.

45. The process of claim 40 wherein $C_{70}$ is additionally present in the sooty carbon product and is separated from the sooty carbon product and is additionally present in the crystalline $C_{60}$.

46. The process according to claim 45 wherein said $C_{70}$ is separated from the crystalline $C_{60}$.

47. The process according to claim 40 wherein said crystalline $C_{60}$ is purified crystalline $C_{60}$.

48. The process according to claim 40 wherein the elemental carbon is graphite, amorphous carbon or glassy carbon.

49. A process for producing $C_{60}$ comprising:
 (a) vaporizing elemental carbon in an atmosphere of an inert gas at a pressure sufficient to generate a sooty carbon product comprising $C_{60}$; said $C_{60}$ being present in sufficient quantities to recover therefrom $C_{60}$ in amounts to be discernible as a colored solid;
 (b) separating said $C_{60}$ from said sooty carbon product under conditions effective to recover therefrom a colored crystalline $C_{60}$.

50. The process according to claim 49 wherein the pressure is less than 1 atmosphere pressure.

51. The process according to claim 50 wherein the pressure is greater than about 50 torr.

52. The process according to claim 51 wherein the pressure ranges from about 50 torr to about 400 torr.

53. The process according to claim 49 wherein $C_{70}$ is additionally present in the sooty carbon product.

54. The process according to claim 49 wherein $C_{70}$ is additionally present in the sooty carbon product and is additionally separated from the sooty carbon product and is present in the crystalline $C_{60}$.

55. The process according to claim 54 wherein the $C_{70}$ is separated from the crystalline $C_{60}$.

56. The process according to claim 49 wherein the crystalline $C_{60}$ is purified crystalline $C_{60}$.

57. A process for preparing $C_{60}$ comprising vaporizing elemental carbon selected from the group consisting of graphite, amorphous carbon and glassy carbon in an inert quenching gas at a pressure of at least 50 torr so as to generate a carbon soot comprising $C_{60}$ and separating said $C_{60}$ from said soot under conditions effective to recover purified crystalline $C_{60}$ therefrom.

58. The process according to claim 57 wherein the pressure ranges from about 50 torr to about 400 torr.

59. A process for preparing $C_{60}$ comprising:
 (a) vaporizing elemental carbon in the presence of an inert quenching gas at a pressure ranging from less than 1 atmosphere up to a pressure of 10 atmospheres under conditions effective to form a sooty carbon product comprising $C_{60}$ in quantities sufficient to isolate $C_{60}$ as a solid when extracted from the sooty carbon product;
 (b) depositing the sooty carbon product on a collecting surface remote from said situs of vaporization;
 (c) removing the sooty carbon product from the collecting surface; and
 (d) extracting $C_{60}$ from said sooty carbon product in quantities sufficient to isolate $C_{60}$ as a solid when extracted from the sooty carbon product.

60. A process for preparing $C_{60}$ comprising:
 (a) vaporizing elemental carbon in the presence of an inert quenching gas under a pressure ranging from less than 1 atmosphere up to 10 atmospheres under conditions effective to form a sooty carbon product comprising $C_{60}$ in quantities sufficient to isolate $C_{60}$ as a discernible solid when extracted from the sooty carbon product;
 (b) extracting $C_{60}$ from said sooty carbon product in quantities sufficient to isolate said $C_{60}$ as a discernible solid.

61. The process according to claim 59 or 60 wherein said elemental carbon is placed into an evacuated reactor prior to the vaporization thereof.

62. The process according to claim 59 or 60 wherein the elemental carbon is vaporized in a bell jar carbon evaporator.

63. The process according to claim 59 or 60 wherein extracting comprises contacting the sooty carbon product with a non-polar organic solvent effective to dissolve the $C_{60}$, said solvent being present in amounts sufficient to dissolve the $C_{60}$ present in said sooty carbon product.

64. The process according to claim 63 wherein said non-polar organic solvent is benzene, toluene, carbon tetrachloride, 1,1,1-trichloroethane, xylene or an alkane having 5–10 carbon atoms.

65. The process according to claim 59 or 60 wherein $C_{70}$ is additionally present in the extracted $C_{60}$.

66. The process of claim 65 which additionally comprises separating the $C_{70}$ from $C_{60}$.

67. The process according to claim 59 or 60 which additionally comprises purifying the extracted $C_{60}$ product.

68. The process according to claim 59 or 60 wherein the product is substantially purified $C_{60}$.

69. The process according to claim 59 or 60 wherein extracting comprises subliming the $C_{60}$ from the sooty carbon product and condensing the sublimed $C_{60}$.

70. The process according to claim 59 or 60 wherein the pressure of the ranges from 50 to 400 torr.

71. The process according to claim 59 or 60 wherein the extracted product is in solution.

72. The process according to claim 59 or 60 wherein said extracted $C_{60}$ product is in solution of a non-polar organic solvent.

73. The process according to claim 72 wherein the non-polar organic solvent is benzene, toluene, carbon tetrachloride, 1,1,1-trichloroethane, xylene or an alkane having 5–10 carbon atoms.

74. The process according to claim 59 wherein depositing comprises collecting the sooty carbon product on a collecting surface distanced 5–10 cm from said vaporization situs.

75. A process for preparing $C_{60}$ comprising:
 (a) vaporizing elemental carbon to form vapor in an atmosphere of an inert gas;
 (b) quenching said carbon vapor in an inert gas under conditions sufficient to effectively condense and nucleate said vapor to form a sooty carbon product comprising $C_{60}$ molecules in sufficient quanities to extract therefrom an amount sufficient to collect said $c_{60}$ as a crystalline product;
 (c) collecting said sooty carbon product;
 (d) separating said $C_{60}$ from said sooty carbon product and recovering therefrom said $C_{60}$ in crystalline form.

76. The process according to claim 75 wherein the inert gas is helium or argon.

77. The process according to claim 75 wherein the carbon vapor is quenched at a sufficient distance from situs of vaporization to form said sooty carbon product.

78. The process according to claim 77 wherein said distance is about 5 to 10 cm from the situs of vaporization.

79. The process according to claim 75 wherein the $C_{60}$ recovered therefrom is purified crystalline $C_{60}$.

80. The process according to claim 75 wherein $C_{70}$ is additionally present in the sooty carbon product and is additionally present in the crystalline product.

81. The process according to claim 80 wherein the $C_{60}$ is separated from $C_{70}$.

82. The process according to claim 75 wherein the inert gas is at a pressure less than 1 atomsphere.

83. The process according to claim 82 wherein the pressure ranges from about 50 toor to about 400 toor.

\* \* \* \* \*